United States Patent
McQuaid et al.

(10) Patent No.: US 6,705,433 B2
(45) Date of Patent: Mar. 16, 2004

(54) MODULAR CONVEYOR FOR CHECKSTAND

(75) Inventors: James M McQuaid, Seattle, WA (US); Harry B. Todd, Port Orchard, WA (US); Charles W. Lindstrom, Lynnwood, WA (US); Kenneth D. Baker, Everett, WA (US)

(73) Assignee: Selkirk Industries, LLC, Lynnwood, WA (US)

( * ) Notice: Subject to any disclaimer, the term of this patent is extended or adjusted under 35 U.S.C. 154(b) by 120 days.

(21) Appl. No.: 10/053,481

(22) Filed: Jan. 15, 2002

(65) Prior Publication Data

US 2003/0132064 A1 Jul. 17, 2003

(51) Int. Cl.$^7$ .......................... A47F 9/04; B65G 21/00; B65G 41/00
(52) U.S. Cl. ...................... 186/68; 198/861.1; 198/841
(58) Field of Search ............................ 186/68, 49, 59, 186/60, 69, 33; 198/860.1, 861.1, 841, 845

(56) References Cited

U.S. PATENT DOCUMENTS

| | | | | |
|---|---|---|---|---|
| 2,688,394 A | * | 9/1954 | Hurd et al. .................. | 198/816 |
| 3,878,937 A | * | 4/1975 | Glaser et al. ................ | 198/835 |
| 4,650,067 A | * | 3/1987 | Brule ......................... | 198/841 |
| 4,925,009 A | * | 5/1990 | Hill ............................. | 198/583 |
| 5,156,260 A | * | 10/1992 | Dorner et al. ............... | 198/813 |
| 6,170,645 B1 | * | 1/2001 | Mitchell ...................... | 198/816 |
| 6,422,382 B1 | * | 7/2002 | Ertel et al. ................. | 198/860.1 |
| 2001/0001462 A1 | * | 5/2001 | Chandler et al. ........... | 219/388 |
| 2002/0112940 A1 | * | 8/2002 | Dickover et al. ........... | 198/835 |
| 2003/0010607 A1 | * | 1/2003 | Romeo ..................... | 198/860.1 |

FOREIGN PATENT DOCUMENTS

| | | | | |
|---|---|---|---|---|
| EP | 0.312.643 A1 | * | 4/1989 | ............ B65G/23/44 |
| GB | 2.183.584 A | * | 6/1987 | ............ B65G/21/00 |
| JP | 62-27212 A | * | 2/1987 | ............ B65G/21/00 |

* cited by examiner

Primary Examiner—Donald P. Walsh
Assistant Examiner—Mark J Beauchaine
(74) Attorney, Agent, or Firm—Leydig, Voit & Mayer, Ltd.

(57) ABSTRACT

A modular conveyor that may used, for example, as a take-away conveyor or an accumulation conveyor in a checkstand. The modular conveyor includes front and rear brackets that are configured for attachment of rollers for the conveyor belt. The front and rear brackets are designed so that they may be attached to a deck, such as a wooden board. The belt is attached on the rollers, and wraps over the deck. The length of the deck, or wooden board, may be varied, permitting same-shaped brackets to be used to form variable lengths of conveyors. Two brackets may be used for each end of the conveyor, one each for supporting opposite sides of the roller at that end of the conveyor. In this manner, the deck may be widened or narrowed, so that the same brackets may be used to create conveyors of various widths.

20 Claims, 4 Drawing Sheets

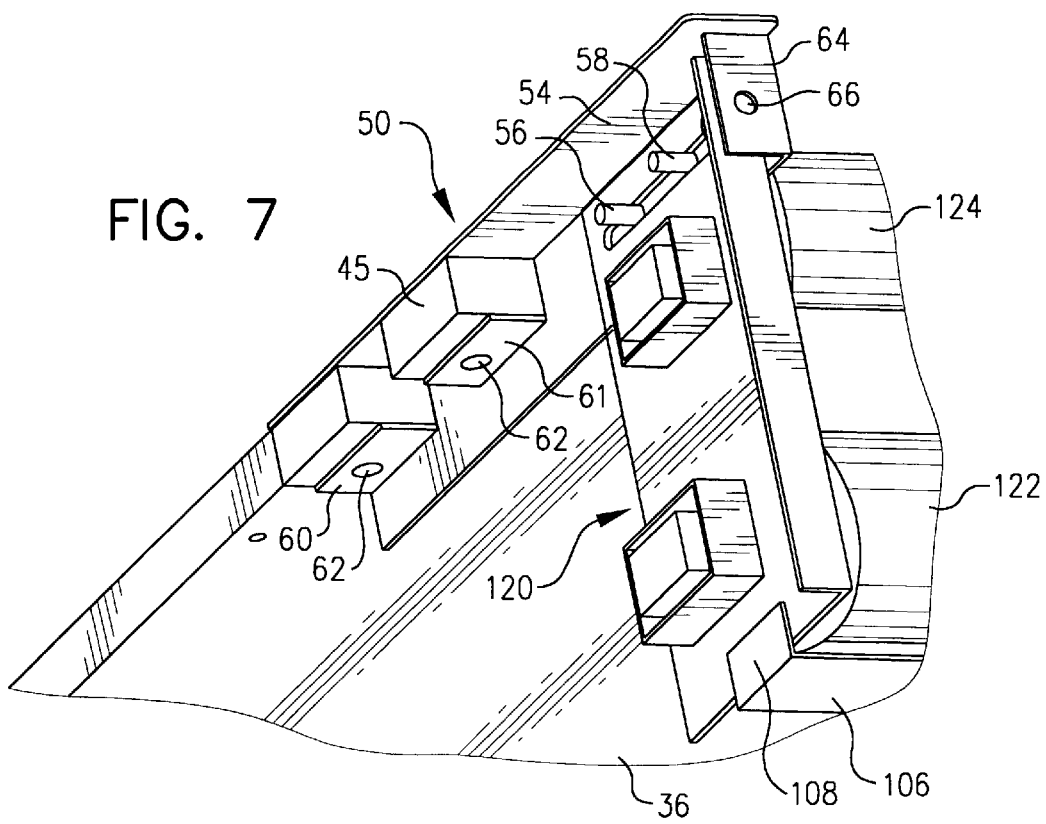

MODULAR CONVEYOR FOR CHECKSTAND

FIELD OF THE INVENTION

The present invention relates to checkstands, and, more specifically, to store checkstands.

BACKGROUND OF THE INVENTION

A checkstand is a station at which a customer or clerk in a store, such as a grocery store, unloads the items the customer intends to purchase, e.g., groceries, a register clerk scans or enters the prices of the items, the customer pays for the items, the items are bagged, and the bagged groceries are placed in a cart or handed to the customer. In some stores, a separate clerk bags the items and places the bags into a cart. A number of checkstands are usually lined along the exit of a store so that multiple customers may purchase items at the same time on the way out of the store.

One design of a checkstand includes a front module upon which the customer unloads groceries or other items. A scanner and register are located at the trailing end of the front module. The front module usually includes a conveyor, called an "accumulation conveyor," onto which a register clerk or a customer unloads items for purchase. The accumulation conveyor conveys the groceries toward the scanner and the cash register. A register clerk lifts each of the items from the accumulation conveyor and either scans the item across the scanner, or manually enters the price and stock number information in the cash register.

Some checkstands include a second conveyor, called a "take-away conveyor," that extends from the scanner and/or register to a rear portion of the checkstand. A register clerk deposits scanned items on the front end of the takeaway conveyor, and the take-away conveyor deposits the scanned items at the trailing end of the rear module, where a bagging clerk places each of the scanned items into bags.

For some checkstands, the accumulation conveyor and the take-away conveyor are constructed in a similar manner. In one typical construction of these conveyors, the length of a conveyor is determined, and two steel rails are machined to the length of the conveyor. The steel rails are elongate angle-iron structures (i.e., have a cross-section of an "L"), and include fastener and attachment holes at their ends. A board, called a "deck," extends between the two rails and supports the belt for the conveyor. The back of one side of the rail abuts against the deck, and a plastic sleeve is attached to the rail that is configured to extend under the deck. The opposite side of the rail extends outward from the deck, and is aligned so that it fits on a top surface of the checkstand.

The fastener holes and attachment holes on the rails are arranged and configured for attachment of rollers for the belt for the conveyor. For example, a powered roller may be attached to one end of the steel rails, and an idler roller may be attached to the other end. The two rollers are fixed to the ends of the steel rails, and the belt is looped between the two rollers. The steel rails provide a rigid structure for supporting the belt and for maintaining the proper alignment of the rollers.

Although the steel rails used in prior art checkstand conveyors work well for their intended purpose, there are problems with their use and manufacture. The rails must be machined to exact lengths, and the fastener and other attachment holes must be machined in their appropriate locations. Because the checkstands are not all the same length, checkstand manufacturers must have sophisticated metalworking equipment, or must be heavily reliant upon a metal shop for production of conveyors having different lengths.

SUMMARY OF THE INVENTION

The present invention is directed to a modular conveyor that may be used, for example, as a take-away conveyor or an accumulation conveyor in a checkstand. The modular conveyor includes front and rear brackets that are configured for attachment of rollers for the conveyor belt. The front and rear brackets are designed so that they may be attached to a deck, such as a wooden board. The belt is attached on the rollers, and wraps around the deck. The length of the deck, or wooden board, may be varied, permitting same-shaped brackets to be used to form variable lengths of conveyors. By simply changing the length of the deck, shorter or longer conveyors may be produced using the same brackets.

In accordance with one aspect of the invention, two brackets are used for each end of the conveyor, one each for supporting opposite sides of the roller at that end of the conveyor. In this manner, the deck may be widened or narrowed, so that the same brackets may be used to create conveyors of various widths. Changing the width of the deck permits conveyors to be produced having a wider belt and rollers.

In accordance with another aspect of the present invention, the deck is made of wood, and thus it may easily be cut to desired lengths or widths. Thus, a manufacturer may stock only a limited number of brackets (front left, front right, rear left, rear right) and may produce multiple different lengths and widths of conveyors. Two or more of the brackets (e.g., front right and rear left) may be interchangeable, permitting even fewer types of brackets to be stocked by a manufacturer.

In accordance with another aspect of the present invention, the brackets at one or both ends of the conveyor may be formed to hold more than one roller. This feature permits, for example, a powered roller to be mounted under an idler roller, which may work well for mounting a conveyor in a tight space, for example.

Other advantages will become apparent from the following detailed description when taken in conjunction with the drawings, in which:

BRIEF DESCRIPTION OF THE DRAWINGS

FIG. 7 is an alternate embodiment of the corner of the conveyor shown in FIG. 5.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "rear," and the like, the orientations are to aid the reader in understanding the invention, and are not meant to be limiting.

Figure 1:
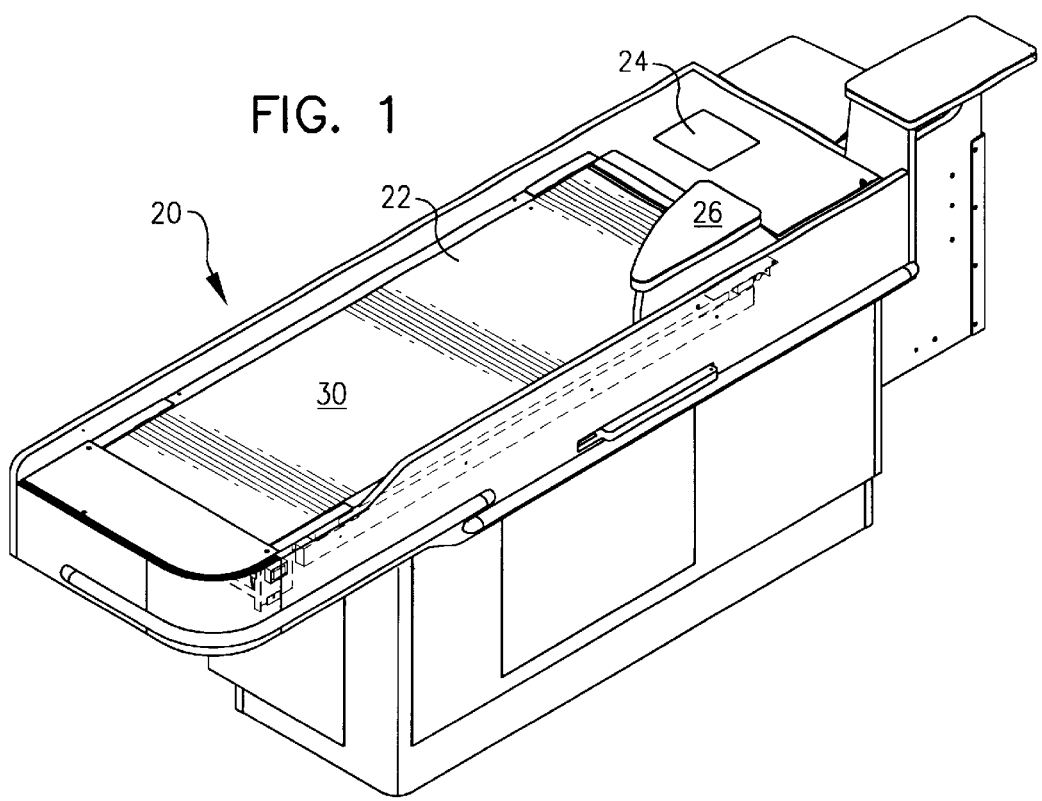
FIG. 1 is a perspective view of a front module of a checkstand, the front module including a conveyor that incorporates the present invention.

Referring now to the drawings, in which like numerals represent like parts throughout the several views, FIG. 1 shows a front module 20 for a checkstand. The full checkstand is not shown, but its construction is known in the art. In some embodiments of checkstands, the checkstand includes a front module (e.g., the front module 20) and a rear module. Briefly described, the checkstand is arranged so that a customer places groceries or other items on the front module 20 and the items are conveyed to a register and/or scanner for scanning. The scanned items may then be placed on a take-away conveyor on the rear module (not shown, but known in the art).

The present invention is directed to a novel modular conveyor that may be used, for example, as an accumulation conveyor 22 for the front module 20. As another example, a modular conveyor made in accordance with the present invention may be used as a take-away conveyor in a checkstand, for example in a checkstand rear module, which may be separate from, or integral with, the front module.

For ease of description, the left side of FIG. 1 is referred to as the "leading," or front, end of the front module 20, and the right side of FIG. 1 is referred to as the "trailing," or rear, end of the front module. The side of the front module 20 opposite the viewer in FIG. 1 is referred to as the "register clerk" side, and the side on the same side as the viewer is the "customer" side of the front module 20.

In addition to the accumulation conveyor 22, the front module 20 may include a scanner 24 located at the trailing end of the accumulation conveyor 22. Along the register clerk side of the accumulation conveyor 22, adjacent to the scanner 24, may be located such items as a cash drawer and a register (not shown, but known in the art). These items are arranged so that they can be easily accessed by a register clerk located in the register clerk side of the front module 20. Other configurations of a front module may be used.

On the customer side of the accumulation conveyor 22, adjacent to the scanner 24, is a check writing surface 26. The check writing surface 26 is arranged so that it may be easily accessed by a customer standing in a customer waiting area adjacent to the accumulation conveyor 22.

The operation and structure of a checkstand incorporating the front module 20 are known in the art. A customer with a cart of items wheels the cart to the front module 20 and the customer or a clerk unloads the items onto the accumulation conveyor 22. The accumulation conveyor 22 moves the items toward the scanner 24. A register clerk standing in the register clerk side of the front module 20 lifts the items from the accumulation conveyor 22 and scans the items on the scanner 24. Alternatively, the price and stock number of the items may be manually entered by the register clerk on a keyboard (not shown). After scanning the items, the register clerk places the scanned items on a take-away conveyor, or bags the items in a bag stand (neither of which are shown, but both of which are known in the art).

The configuration of the front module 20 shown in FIG. 1 may be modified in manners well known to persons skilled in the checkstand art. For example, the front module 20 may be formed integral with a rear module, or may include a bagging station at its trailing end. Other configurations may be used. The present invention, however, has particular application for a conveyor that may be used in a checkstand having any configuration. The conveyor may be used for multiple different purposes, such as an accumulation conveyor, or as a take-away conveyor for the checkstand. For ease of description, the features of the invention will be described with respect to the accumulation conveyor 22 in the front module 20 shown in the drawings. However, it is to be understood that the features of the present invention may be used for any conveyor in any configuration of a checkstand.

Figure 2:
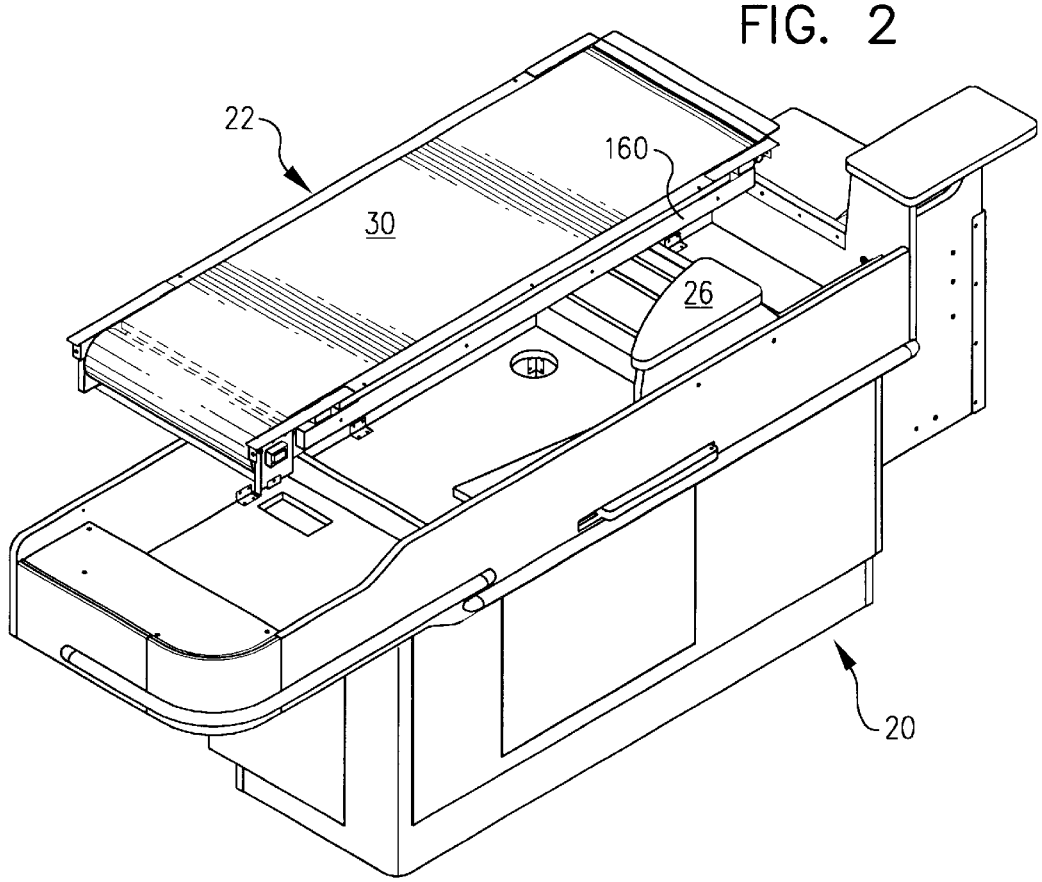
FIG. 2 is an exploded perspective view of the front module of FIG. 1, with the conveyor shown removed from the front module.
Figure 3:
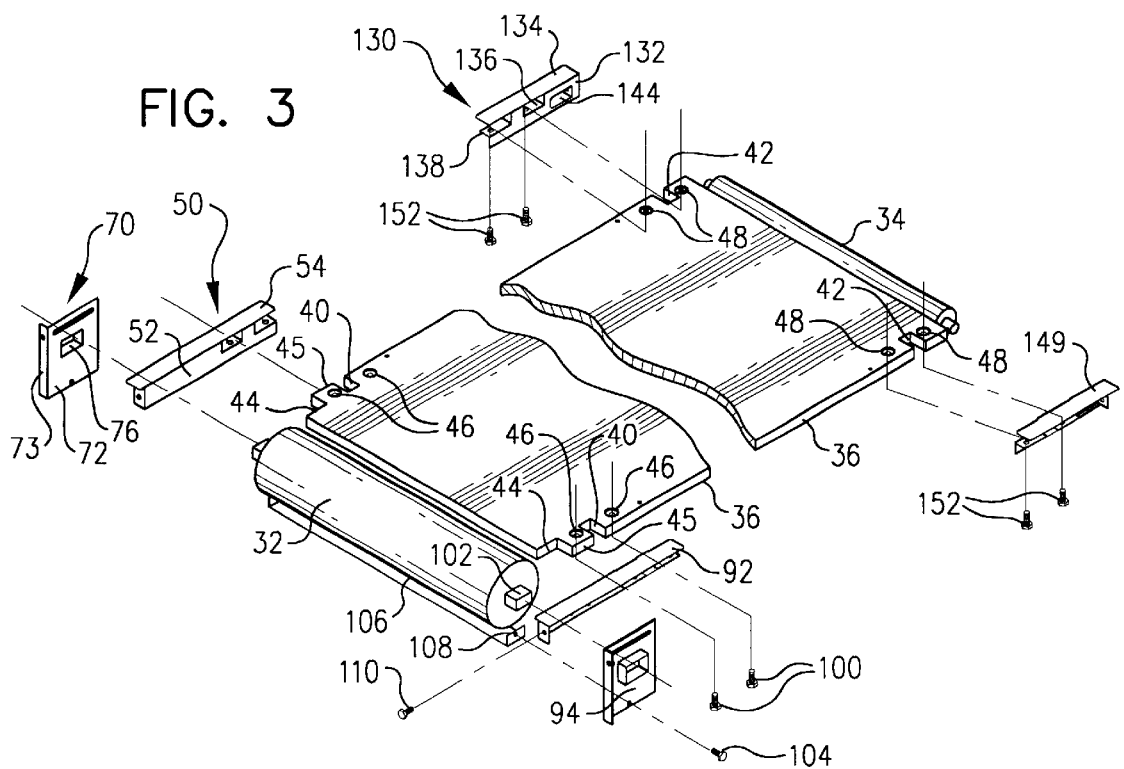
FIG. 3 is a partial cutaway, exploded perspective view of the conveyor of FIG. 1, with a belt for the conveyor removed.

The accumulation conveyor 22 is removably fitted into the top of the front module 20, as is shown in FIG. 2. A belt 30 extends around a front powered roller 32 and a rear idler roller 34 (both are best shown in FIG. 3) for the accumulation conveyor 22. A deck 36 (FIG. 3) extends between the powered roller 32 and the idler roller 34. A top length of the belt 30 between the two rollers 32, 34 extends over the top of the deck 36. The deck 36 may extend under only a portion of the top length, but preferably extends under most of it so that it may support items on the belt. In the embodiment shown in FIG. 3, the deck 36 includes notches 40 at front, side edges, slightly spaced from the forwardmost end, and notches 42 at rear, side edges, slightly spaced from the rearwardmost end. Additional notches 44 are provided at the forwardmost end of the deck 36, forming protrusions 45 extending outward from the deck 36. Attachment holes 46 extend through the deck 36 on opposite sides of the forward notches 40, and similar attachment holes 48 extend through the deck 36 on opposite sides of the rearward notches 42. As further described below, the deck 36 is formed of wood or a similar material that is easy to cut so that is may easily cut to length and size, and so that the notches and attachment holes may be easily formed therein.

Figure 4:
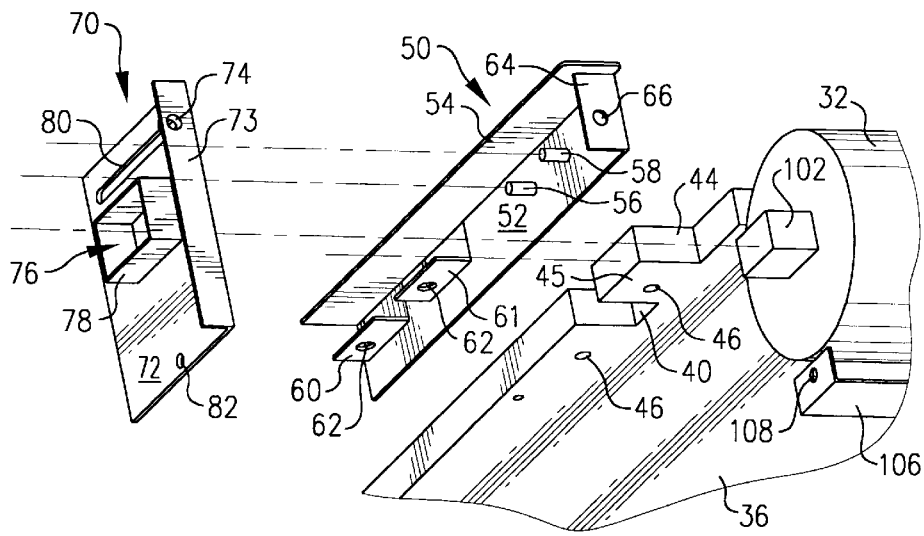
FIG. 4 is a partial cutaway, exploded perspective view of one corner of the conveyor in FIG. 2.
Figure 5:
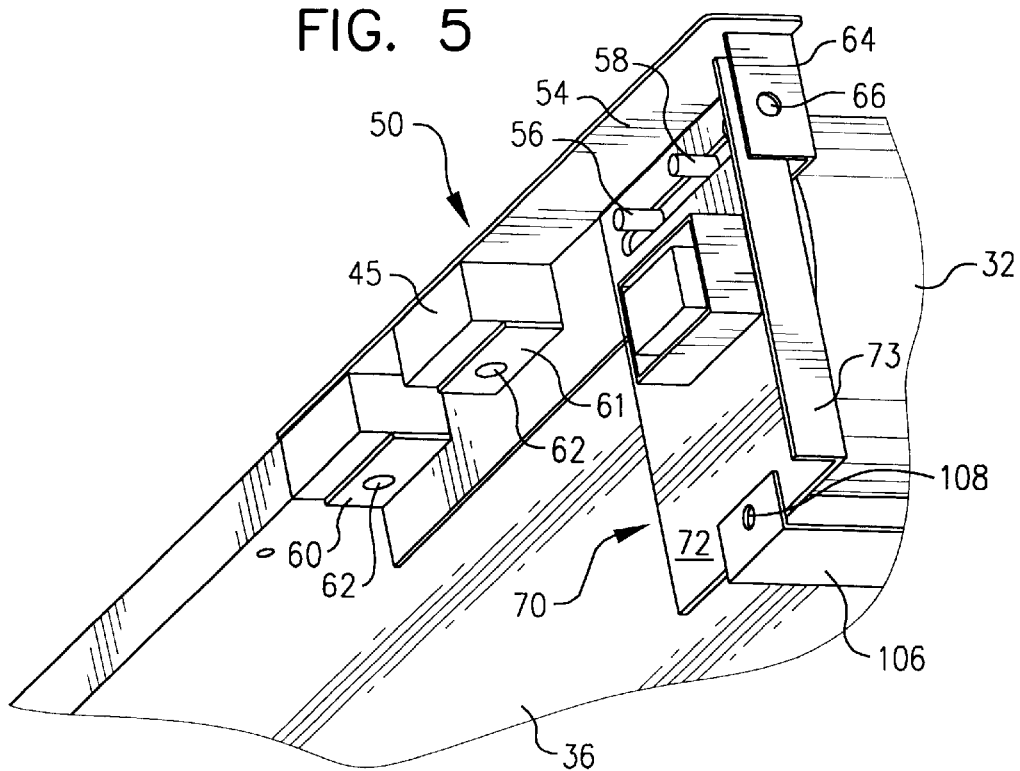
FIG. 5 is a perspective, assembled view of the corner of the conveyor shown in FIG. 4.

The attachment of the powered roller 32 to the front of the deck 36 is shown in detail in FIGS. 4 and 5. A front bracket 50 is provided that is formed of steel, aluminum, plastic, or another material that is sufficiently rigid to hold the powered roller in position. The front bracket 50 includes an upright base 52, and an upper flange 54 bent perpendicular to the base 52 and extending outward from the top of the base. A pair of pegs 56, 58 extend outward from the base 52, and are located at a forward part of the base and spaced the same amount from the upper flange 54. A pair of flanges 60, 61 are bent outward from the base 52, forming holes above the flanges 60, 61. Fastener holes 62 are located in the flanges 60. A front flange 64 is bent perpendicularly outward from the base 52 so that the front flange extends perpendicular to the upper flange 54. A fastener hole 66 is located in the front flange 64.

A roller plate 70 is attached for sliding movement relative to the front bracket 50. The roller plate 70 may take many different configurations and shapes, but in general, is configured so that the roller may attach to the roller plate, and the roller plate in turn is attached to the front bracket 50. In this manner, the roller plate 70 serves as a connection between the roller and the front bracket. The roller plate 70 includes a base 72 oriented parallel with the base 52 of the front bracket 50, and a front flange 73 bent outward from the base 72 and extending along the front edge of the base. The front flange 73 includes a fastener hole 74 that aligns with the fastener hole 66 on the front flange 64 of the front bracket 50.

A receptacle 76 extends out of the middle of the base 72 of the roller plate 70. The receptacle 76 includes a flange 78 about its periphery. A slot 80 is formed in a top portion of the base 72, and is arranged so that it fits around the pegs 56, 58 on the base 52 of the front bracket 50. A fastener hole 82 is located on the bottom of the base 72 of the roller plate 70.

A front bracket 92 and a front roller plate 94 on the opposite side of the deck 36 are mirror images of the front bracket 50 and the front roller plate 70 described, and their structure will not be repeated here. In addition, their installation is similar, and will not be repeated.

To install the front bracket 50 and the front roller plate 70, the holes above the flange 61 on the front bracket 50 are aligned with the protrusions 45 on the deck 36. The front bracket 50 is then seated on the forward part of the deck 36, so that the fastener holes 62 on the flanges 60, 61 of the front bracket align with the fastener holes 46 on the deck 36. Suitable fasteners 100 (FIG. 3) may be used to affix the front bracket to the deck through these fastener holes. The fit of the notches 40, 44 and the protrusion 45 on the deck into the holes above the flanges 60, 61 on the front bracket 50 assures proper alignment and secure attachment of the front bracket to the deck.

The roller plate 70 attaches the powered roller 32 to the front bracket 50. To this end, the powered roller includes a square end 102 for its axle, and that square end fits into the receptacle 76. The slot 80 is fitted over the pegs 56, 58 (FIG. 5), and the base 72 of the roller plate is aligned against the base 52 of the front bracket 50. A fastener 104 (FIG. 3) fits through the fastener hole 82 in the bottom of the roller plate 70, and into a fastener hole 108 on an elongate bracket 106. The elongate bracket 106 extends under the powered roller 32, and attaches to the opposite roller plate 94.

A second fastener 110 (FIG. 3) fits into the fastener hole 66 on the front flange 64 of the front bracket 50, and into the fastener hole 74 on the front flange 73 of the roller plate 70. This fastener 110 may include a locking mechanism, such as lock nuts, that permits the roller plate 70 to be adjusted, front to rear, relative to the front bracket 50. Alternatively, the fastener 110 may be tightened to fix the position of these two elements. However, by permitting adjustment, the belt 30 may be tightened onto the powered roller 32. In this manner, the locking mechanism and the fastener serve as an adjustment mechanism for tightening the belt 30 onto the rollers 32, 34.

The front bracket 50 may be used with roller plates having different designs. As an example, as shown in FIG. 7, a roller plate 120 may include attachment locations for more than one roller. This design permits, for example, a powered roller 122 to be mounted under an idler roller 124. By moving a powered roller 122 away from top surface of the conveyor, this design permits a conveyor to be mounted where there is limited space at the ends for a powered roller, which typically is larger in diameter than idler rollers. An advantage is gained by the roller plate 70 or 120 being a separate piece from the front bracket, in that multiple different roller configurations may be attached to the front bracket 50, allowing a single design of a front bracket 50 to be used with multiple conveyors. In addition, because the roller plate and the front bracket are different parts, the position of rollers may be adjusted relative to the front bracket 50.

Figure 6:
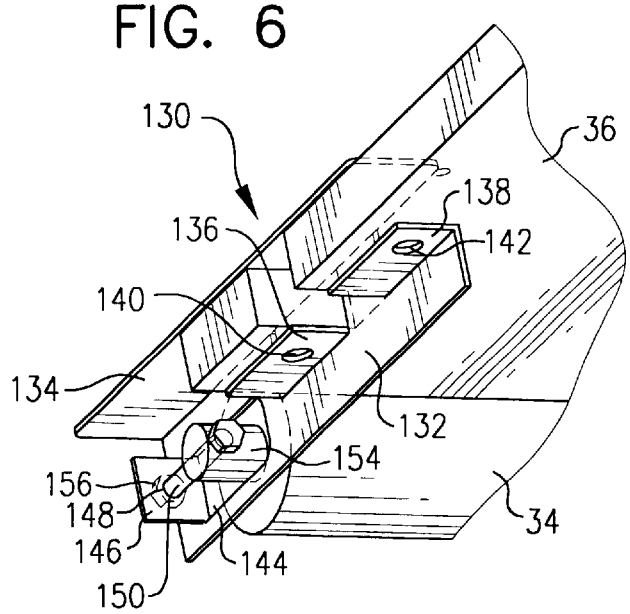
FIG. 6 is a partial cutaway, perspective view of another corner of the conveyor in FIG. 2.

A rear bracket 130 used to attach the rear idler roller 34 to the deck is shown in FIGS. 3 and 6. The rear bracket 130 includes an upright base 132 and an upper flange 134 bent to perpendicular with the base. Two flanges 136, 138 are bent outward from the base, and include fastener holes 140, 142 therein. An elongate slot 144 is formed near the rear of the base 132, and extends horizontally. A flange 146 extends along the rear of the slot 144, and includes a fastener hole 148 therein. A rear bracket 149 on the opposite side of the deck 36 is a mirror image of the rear bracket 130.

To attach the rear bracket 130, the openings above the two flanges 136, 138 are aligned on opposite sides of the notches 42. The flanges 136, 138 fit under the deck 36, and fasteners 152 may be used to attach the rear bracket 130 to the deck (i.e., by extending the fasteners through the fastener holes 140, 142 on the flanges 136, 138 and into the fastener holes 48 on the deck 36). An end 154 (FIG. 6) of the axle for the rear idler roller 34 extends into the elongate slot 144. A fastener 150 (also FIG. 6) extends through the fastener hole 148 in the rear flange 146 of the rear bracket 130 and into a fastener hole (not shown, but extending perpendicular to the end 154) in the end 154. The fastener 150 may include an appropriate locking mechanism 156, such as a locking nut or nuts, for locking the position of the end 154 relative to the rear flange 146. In this manner, the fastener 150 may be tightened to cause the belt 30 to be stretched tight, and the locking mechanism may be used to hold the position of the fastener. Thus, the fastener 150 and the locking mechanism 156 serve as an adjustment mechanism for tightening the belt 30.

After the brackets 50, 92, 130, 149 have been attached to the deck 36, a pair of elongate slats 160 (only one of which is shown in FIG. 2) are aligned under the side edges of the deck 36. The elongate slats 160 may be formed, for example, of wood. Preferably, the elongate slats are oriented so that the width of the slats extends vertically, and thus the slats may provide rigidity for, and prevent warpage of, the deck 36. The slats 160 may be attached to the deck 36 or the brackets 50, 92, 130, 149 in an appropriate manner, e.g., screws. When installed, the conveyor 22 rests on the slats 160. A shelf or other structure may be provided on the top surface of the front module 20 for supporting the slats 160 so that the top of the conveyor is located at the appropriate height.

The brackets 50, 92, 130, 149 of the present invention may be used with decks 36 having varying lengths and/or widths. In this manner, a manufacturer may stock a number of the brackets 50, 92, 130, 149 and may construct conveyors of various sizes. If the decks are made of wood or another easily cut or formed material, then the manufacturer can construct the deck on site with relatively little shop equipment, avoiding the expense of having rails or other metal structures machined for each deck 36. This feature significantly reduces the cost of manufacture of conveyors for checkstands, and permits a manufacturer to quickly produce a conveyor without having to machine special parts for the conveyor. The notches 40, 42, and 44, and the fastener holes may also be easily formed.

If desired, the brackets 50, 92, 130, 149 may be produced differently. For example, a single bracket may be formed that fits onto an end of the deck 36 and receives a conveyor roller. However, by using separate brackets for each side of an end, changes in the width of the deck and rollers are easily accommodated.

Although the described embodiments show the powered roller located at a front end of the deck, the powered roller may, as described above, be located below the top of the deck. In addition, if desired, the powered roller may be located at the rear of the deck, or below the rear of the deck. To this end, the rear bracket may include a structure that permits more than one roller (e.g., an idler roller and a powered roller) to be attached to the rear bracket.

The brackets 50, 92, 130, 149 may have other configurations, and in general are constructed so that they can attach to the deck 36 and support a roller, such as a powered or idler roller. If desired, as described above, a separate structure, such as the roller plate, may be provided for attaching to a bracket and the roller. These structures may be used with powered, idler, or other rollers, on either the front or rear of the conveyor.

Although the described embodiment describes notches 40, 42, and 44 for use on the deck 36, the front and rear brackets may simply attach to straight or other-shaped sides or ends of the deck 36. However, the notches provide the advantages of easy alignment of the brackets 50, 92, 130, 149, and added stability of the connection of the brackets.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A checkstand, comprising:
   a conveyor mounted within the checkstand, comprising:
      a deck;
      a belt extending over at least a portion of the deck;
      at least one first bracket connected to a first end of the deck;
      a first roller connected to the at least one first bracket, the belt being wrapped around the first roller;
      at least one second bracket, independent of the first bracket, and connected to a second end of the deck, the sole supporting connection between the two brackets being the deck; and
      a second roller connected to the at least one second bracket, the belt being wrapped around the second roller.

2. The checkstand of claim 1, wherein the at least one first bracket comprises two brackets, each connected to opposite ends of the first roller.

3. The checkstand of claim 2, wherein the two brackets each comprise an attachment structure for attaching to respective sides of the deck.

4. The checkstand of claim 2, wherein the at least one second bracket comprises two brackets, each connected to opposite ends of the second roller.

5. The checkstand of claim 1, wherein the first roller is slidingly connected to the at least one first bracket so that its position may be adjusted toward and away from the second roller.

6. The checkstand of claim 5, further comprising a locking mechanism that is capable of fixing the position of the first roller relative to the second roller.

7. The checkstand of claim 6, wherein the locking mechanism comprises a fastener and a locking nut.

8. The checkstand of claim 5, wherein the roller is connected to a structure that is separate from the at least one first bracket and is slidingly mounted to the at least one first bracket.

9. The checkstand of claim 8, wherein the structure comprises a plate that is connected to the roller and that is slidingly connected to the at least one first bracket.

10. The checkstand of claim 5, wherein the at least one first bracket comprises two brackets, each connected to opposite ends of the first roller, and further comprising a structure for each of the brackets that is separate from the respective bracket and is slidingly mounted to the respective bracket and to which the roller connects.

11. The checkstand of claim 10, further comprising a locking mechanism for each of the structures, the locking mechanism being capable of fixing the position of the structure relative to the second roller.

12. The checkstand of claim 1, wherein the first roller is connected to a structure that is separate from the at least one first bracket and is slidingly mounted to the at least one first bracket.

13. The checkstand of claim 12, wherein the structure comprises a plate that is connected to the roller and that is slidingly connected to the at least one first bracket.

14. The checkstand of claim 1, wherein the deck comprises wood.

15. A checkstand, comprising:
   a conveyor mounted within the checkstand, comprising:
      a deck
      a belt extending over at least a portion of the deck;
      at least two first brackets connected to a first end of the deck and connected on opposite ends of the first roller;
      a first roller connected to the at least one first bracket, the belt being wrapped around the first roller;
      at least one second bracket, independent of the first bracket, and connected to a second end of the deck; and
      a second roller connected to the at least one second bracket, the belt being wrapped around the second roller;
      wherein the two first brackets each comprise an attachment structure for attaching to respective sides of the deck, and the attachment structure comprises a protrusion on one of the deck or the respective bracket that fits into an opening on the other of the deck or the respective bracket.

16. The checkstand of claim 15, wherein the attachment structure comprises a second protrusion on one of the deck or the bracket that fits into a second opening on the other of the deck or the bracket.

17. A checkstand, comprising:
   a conveyor mounted within the checkstand, comprising:
      a deck;
      a belt extending over at least a portion of the deck;
      at least one first bracket connected to a first end of the deck;
      a first roller connected to a structure that is separate from the at least one first bracket and slidingly mounted to the at least one first bracket, the belt being wrapped around the first roller;
      at least one second bracket, independent of the first bracket, and connected to a second end of the deck;
      a second roller connected to the at least one second bracket, the belt being wrapped around the second roller; and
      a third roller connected to the structure or to the first bracket, the belt being wrapped around the third roller, the third roller comprising a powered roller.

18. The checkstand of claim 17, wherein the third roller is disposed below the first roller.

19. A conveyor, comprising:
   a deck;
   a belt extending over at least a portion of the deck;
   at least one first bracket connected to a first end of the deck;

a first roller connected to the at least one first bracket, the belt being wrapped around the first roller;

at least one second bracket, independent of the first bracket, and connected to a second end of the deck, the sole supporting connection between the two brackets being the deck; and a second roller connected to the at least one second bracket, the belt being wrapped around the second roller.

20. A method of forming a conveyor, comprising:

cutting a deck to a desired length;

attaching a first roller to a first end of the deck;

attaching a second roller to a second end of the deck, the deck being the only supporting connection between the first and second rollers; and extending a belt around the first and second rollers.

* * * * *